Figure 1:
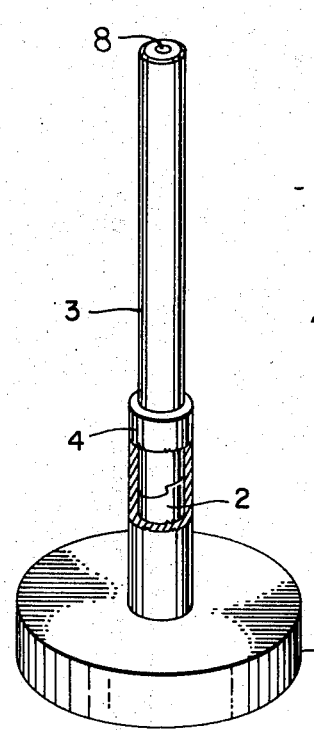
Figure 2:
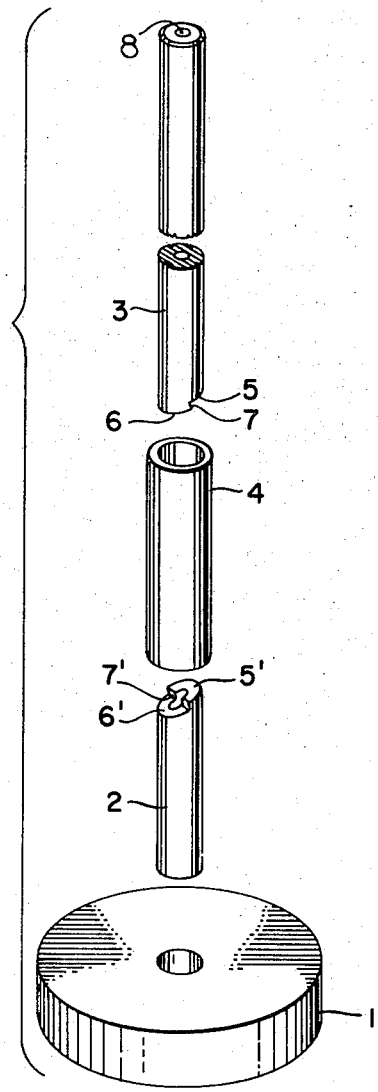
Figure 3:
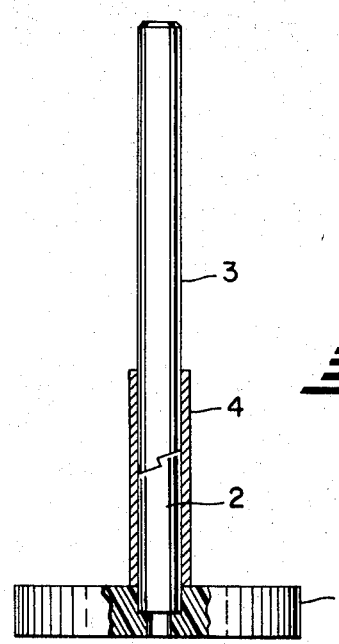

United States Patent [19]

Jinbo et al.

[11] 3,721,794
[45] March 20, 1973

[54] CLUTCH DEVICE

[75] Inventors: Shoji Jinbo, Okazaki; Setsuo Kedo; Takehisa Yaegashi, both of Toyota, all of Japan

[73] Assignee: Toyota Jidosha Kogyo Kabushiki Kaisha, Toyota City, Aichi-ken, Japan

[22] Filed: Dec. 13, 1971

[21] Appl. No.: 207,496

[30] Foreign Application Priority Data

Dec. 22, 1970 Japan ............................. 45/130284

[52] U.S. Cl. ......................... 192/70.19, 192/110 R
[51] Int. Cl. ............................................. F16d 13/44
[58] Field of Search.... 192/70.17, 70.18, 70.19, 70.2, 192/70.21, 70.22, 70.23, 70.24, 70.27, 70.28, 70.29, 70.3, 110 R, 94; 188/218 XL

[56] References Cited

UNITED STATES PATENTS

| 1,928,191 | 9/1933 | Van Meurs | 192/70.23 X |
| 1,997,264 | 4/1935 | Nutt | 192/70.3 X |
| 2,893,524 | 7/1959 | Ferrier | 192/94 X |

*Primary Examiner*—Allan D. Herrmann
*Attorney*—Stevens, Davis, Miller & Mosher

[57] ABSTRACT

A clutch device comprising a flywheel, a pressure plate and a clutch disk interposed between said flywheel and said pressure plate for clutching and declutching the fly-wheel and clutch disk to effect or interrupt power transmission therethrough by bringing the pressure plate into or out of pressing engagement with the clutch disk. Said clutch disk is brought into engagement with a driven shaft through a spline connection of an angle of torsion capable of producing an axially directed thrust acting in a direction in which the clutch disk moves away from the flywheel when the driven shaft is driven by the clutch disk.

2 Claims, 1 Drawing Figure

3,721,794

INVENTOR
ALBERT J. FLIS
Walter J. Moracelli
ATTORNEY

CLUTCH DEVICE

This invention relates to clutch devices in general, and more particularly it is concerned with a clutch device having a novel spline connection between the clutch disk and the driven shaft.

Clutch devices of the prior art such as those used with motor vehicles have, between the hub of the clutch and the driven shaft, a spline connection of the straight tooth type in which the spline shaft is parallel to the tooth face. Heretofore, difficulties have been faced with in releasing the clutch disk from engagement with the engaging surface of the flywheel when the pressure plate is pulled back to disengage the clutch due to the fact that the spline connection of the aforesaid construction offers a high resistance to the sliding movement of the clutch disk. This often resulted in clutch failure.

This invention obviates the aforementioned disadvantage of the prior art. Accordingly, this invention has as its object the provision of a clutch device which is effective to preclude clutch failure by producing, between the clutch disk and the driven shaft, a thrust which can overcome the resistance offered by the spline connection to sliding movement of the clutch disk when the clutch disk drives the driven shaft.

According to this invention, there is provided a clutch device comprising a flywheel, a pressure plate and a clutch disk interposed between such flywheel and such pressure plate for clutching and declutching the flywheel and clutch disk to effect or interrupt power transmission therethrough by bringing the pressure plate into or out of pressing engagement with the clutch disk, such clutch disk being brought into engagement with a driven shaft through a spline connection of an angle of torsion capable of producing an axially directed thrust acting in a direction in which the clutch disk moves away from the flywheel when the driven shaft is driven by the clutch disk.

Other and further objects are those inherent in the invention herein illustrated, described and claimed, and will become apparent as the description proceeds.

The drawing is a vertical sectional view of one embodiment of the clutch device according to this invention.

In the clutch device shown in the drawing, a clutch disk assembly 4 is interposed between a flywheel 3 firmly secured to a crank shaft 1 by bolts 2 and a pressure plate 5. A diaphragm spring 8 is interposed between pressure plate 5 and a clutch cover 7 firmly secured to flywheel 3 by bolts 6.

Clutch disk assembly 4 comprises a plurality of cushions 9, a disk plate 10 and a sub-plate 11 firmly secured to opposite sides of disk assembly 4 by pins 12, and disk springs 14 firmly secured to disk plate 10 by pins 13. Clutch facings 15 and 16 are firmly secured by rivets 17 to opposite sides of disk springs 14 so as to transmit power from flywheel 3 to clutch disk assembly 4.

Clutch disk assembly 4 includes a clutch hub 18 which, in turn, includes a boss 19 with a right hand helical tooth spline 20 formed inside boss 19, and a driven shaft or an input shaft 21 of a transmission is formed with a helical tooth spline 22 which is complementary with and adapted to engage the spline 20, so that disk assembly 4 and input shaft 21 can be interconnected by spline engagement.

Input shaft 21 has a forward end 23 which is supported by flywheel 3 through a pilot bearing 24. The boss 19 of clutch hub 18 is slidable axially of input shaft 21 relative to the helical tooth spline 22 thereof.

The aforesaid diaphragm spring 8 is of the same construction and operation as those of known clutch devices. If a clutch pedal (not shown) is depressed to disengage the clutch, then a release bearing 34 pushes and moves leftwardly in the drawing an inner peripheral portion 25 of diaphragm spring 8 through a line 31 connected to a master cylinder, a release cylinder 32 mounted on a housing 30 and a release fork 33. This causes an outer peripheral portion 26 of diaphragm spring 8 to pivot rightwardly in the drawing about a pivot ring 27. Pressure plate 5 is also moved rightwardly by the action of retracting springs 28 firmly secured to pressure plate 5 by pins 29, thereby removing from disk springs 14 a pressing force which has been exerted thereon through clutch facings 15 and 16. The clutch is thus disengaged, thereby interrupting the transmission of power to the shaft.

In case the clutch device is one which employs a straight tooth spline connection of the prior art, it often happens that clutch disk assembly 4 does not readily move away from flywheel 3 when clutch facing 15 and an engaging surface of flywheel 3 have a high coefficient of friction therebetween even if the pressing force to clutch facings 15 and 16 is removed. This is due to the fact that the straight tooth spline connection between the boss 19 of clutch hub 18 and the input shaft 21 offers a high resistance to sliding movement of the clutch disk. Clutch failure thus ensues.

Judging from the state of operation of motor vehicles, this phenomenon occurs in a motor vehicle when clutch disk assembly 4 drives input shaft 21, not when the engine brake is applied.

In order to solve this problem, the clutch device according to this invention employs a novel spline connection comprising right hand spiral tooth splines 20 and 22 for interconnecting boss 19 and input shaft 21 by engagement of these splines 20 and 22 with each other. This arrangement is effective to produce, when power is transmitted by causing clutch disk 4 to drive input shaft 21, an axially directed thrust which moves clutch disk 4 rightwardly in the drawing along the angle of inclination of helical tooth splines. It will be evident that if a suitable angle of torsion is selected for the helical tooth splines it is possible to produce a minimum essential thrust by the spline connection according to this invention.

It will be seen that if the aforesaid axially directed thrust is produced when the pressing force exerted on clutch facings 15 and 16 is removed boss 19 will surely move rightwardly in the drawing by overcoming the resistance offered by the spline connection to sliding movement of the clutch disk and the frictional dragging between clutch facing 15 and flywheel 3, since input shaft 21 is firmly secured in position to the main body of the device. Clutch disk assembly 4 will thus positively be moved away from flywheel 3 a sufficiently large distance to disengage the clutch.

From the foregoing description, it will be appreciated that the clutch device according to this invention is effective to eliminate clutch failure because the device utilizes positively the power transmitted through the clutch for moving the clutch disk in a direction in which the clutch is disengaged. The most important advantage of the present invention lies in the fact that the object of eliminating clutch failure can be accomplished by merely imparting to the spline connection a suitable angle of torsion without any part increment. Consequently, the clutch device according to this invention is easy to maintain and low in cost. An added advantage is that elimination of clutch failure is conducive to increased durability and longer service life of the transmission and driven mechanisms.

It is to be understood that the clutch device according to this invention can have application in not only the type of cluth illustrated and described herein but also any other known clutch.

What is claimed is:

1. A clutch device comprising a flywheel, a pressure plate and a clutch disk interposed between said flywheel and said pressure plate for clutching and declutching the flywheel and clutch disk to effect or interrupt power transmission therethrough by bringing the pressure plate into or out of pressing engagement with the clutch disk, said clutch disk being brought into engagement with a driven shaft through a spline connection of an angle of torsion capable of producing an axially directed thrust acting in a direction in which the clutch disk moves away from the flywheel when the driven shaft is driven by the clutch disk.

2. A clutch device as defined in claim 1 wherein said clutch disk includes a boss formed with a right hand spiral tooth spline which is adapted to engage a complementary right hand spiral tooth spline formed in the driven shaft to provide a spline connection.

* * * * *